United States Patent [19]
Suzuki

[11] Patent Number: 5,222,172
[45] Date of Patent: Jun. 22, 1993

[54] MULTI-CORE SINGLE MODE TYPE OPTICAL FIBER CABLE AND METHOD THEREFOR

[75] Inventor: Naomichi Suzuki, Yachiyo, Japan
[73] Assignee: Fujikura, Ltd., Tokyo, Japan
[21] Appl. No.: 808,798
[22] Filed: Dec. 17, 1991
[30] Foreign Application Priority Data
Dec. 18, 1990 [JP] Japan ................. 2-411572
[51] Int. Cl.⁵ .................................. G02B 6/38
[52] U.S. Cl. ......................... 385/96; 385/97
[58] Field of Search ............ 385/95, 96, 97, 98, 385/99

[56] References Cited

U.S. PATENT DOCUMENTS

| | | | |
|---|---|---|---|
| 3,864,018 | 2/1975 | Miller | 385/98 |
| 4,079,927 | 3/1978 | Rocton | 385/98 X |
| 4,557,556 | 12/1985 | Decker, Jr. | 385/98 X |
| 4,715,876 | 12/1987 | Osaka et al. | 385/96 X |
| 4,893,892 | 1/1990 | Ziemek et al. | 385/96 |
| 4,978,201 | 12/1990 | Yamada et al. | 350/320 |

FOREIGN PATENT DOCUMENTS 0382511 7/1990 European Pat. Off. ......... 385/96

OTHER PUBLICATIONS

Masao Tachikura "Fusion Mass-Splicing for Optical Fibers Using Electric Discharges Between Two Pairs of Electrodes", Applied Optics, vol. 23, No. 3, Feb. 1, 1984, pp. 492–498.
Onodera et al, "Development of Arc Fusion Splicer for Ribbon Fiber MF-3S", Fujikura Technical Review, No. 19, Jan. 1990, pp. 37–42.

Primary Examiner—John D. Lee
Assistant Examiner—Phan T. Heartney
Attorney, Agent, or Firm—Cushman, Darby & Cushman

[57] ABSTRACT

An optical fiber cable of multi-core single-mode type consists of a series of groups of a plurality of optical fibers having end portions fusion spliced to corresponding end portions of adjacent groups of optical fibers at an optical connection loss of at most 0.5dB. Each of the end portions prior to fusion splicing has a radius of curvature in meters defined by $\lambda/1.41$ (where $\lambda$ is a wavelength in $\mu m$ at which said optical fiber cable is used). This structure and method ensures a sufficiently low optical connection loss of the optical fibers which are economically connected in batch and are easily reconnected in case of trouble.

20 Claims, 4 Drawing Sheets

MULTI-CORE SINGLE MODE TYPE OPTICAL FIBER CABLE AND METHOD THEREFOR

BACKGROUND OF THE INVENTION

1. Field of the Invention

This invention relates to an optical fiber cable and more particularly to an optical fiber cable of multi-core single-mode type formed by fusion splicing of the corresponding ends of optical fibers in batch and a method of producing the same.

2. Description of the Related Art

As the demand for optical fiber cables in communication network systems has been increased, there have been developed optical fiber cables each of which comprises serially arranged optical fiber ribbons each having a plurality of optical fibers of multi-core single-mode type arranged in parallel to one after another. For efficient manufacturing purpose the abutting ends of the optical fibers in adjacent optical fiber ribbons are fusion spliced.

Currently, widely known optical fiber cables generally are of either a multi-mode type having a relatively large diameter such as 50 μm or more, or a single-mode type having a relatively small core diameter such as 8 to 10 μm.

End portions of optical fibers of the single-core single-mode type optical fibers are easily fusion spliced by aligning under observation opposed pair of end portions of fibers with each other during fusion. It has been found that single-core single-mode optical fibers can be found to achieve a low optical connection loss across the splice, more specifically an optical connection loss of 0.05 dB or less.

On the other hand, optical fibers of multi-core type are fusion spliced on a fiber splicer in batch by causing the ends of the optical fibers of each optical fiber ribbon to abut against the corresponding ends of the optical fibers in the optical fiber ribbon adjacent to said each optical fiber ribbon without checking whether or not each pair of the end portions of the optical fibers are aligned with each other because of the relatively large number of pairs of optical fibers to be fusion spliced.

As shown in FIG. 1, the end portions of optical fibers 101 exposed from a pair of ribbons are laid in V-grooves 100a formed in a pair of blocks 100 so as to be disposed opposed to each other. Thereafter, the optical fibers 101 on the two blocks 101 are moved toward each other to cause the ends of the optical fibers 101 on one block 100 to abut against the corresponding ends of the optical fibers 101 on the other block 100, and the end portions of the optical fibers 101 are fusion spliced in batch in a short time.

In this fusion splicing of the optical fibers 101 of multi-core type, the opposed ends of the optical fibers in both ribbons are not always accurately aligned because of bending of the end portion of the optical fibers. During the fusion splicing, the opposed end portions of optical fibers 101 on the blocks 100 are attracted toward each other by surface tension exerted on the molten parts of the end portions of fibers such that they, usually at least to some degree, are aligned with each other.

More specifically, in ideal cases, the opposed ends of the corresponding two optical fibers 101 on both blocks 100 to be fusion spliced are normally displaced transversely from each other before fusion splicing, as shown in FIG. 2. As the end portions are molten by the fusion heat produced by arc discharge between electrodes, both the optical fibers 101 are attracted toward each other by surface tension affecting the end portion in an abutted state, as shown in FIG. 3. Finally, the ends of both optical fibers are self-aligned with each other and are connected together, as shown in FIG. 4.

In the optical fibers of multi-mode type having a diameter of 50 μm or more, fusion splicing of the ends of the two optical fibers are approximately ideally performed because of their larger diameter, and in consequence the corresponding ends of the optical fibers in the adjacent optical fiber ribbons can be easily fusion spliced in batch with a low optical connection loss.

With optical fibers of multi-core single-mode type having a diameter of 8 to 10 μm, however, fusion splicing cannot always be performed in an ideal way, although the ends of both optical fibers themselves can be aligned with each other due to surface tension. More specifically, when the ends of the two optical fibers 101 are transversely displaced much before splicing, as shown in FIG. 5, the cores 103 in the respective fibers 101 are deformed and are not aligned with each other after fusion splicing, as shown in FIG. 6, resulting in poor quality of optical fiber cables in respect of large optical connection losses. When, for example, the displacement between the free ends of the cores of corresponding two optical fibers is 12 μm, multi-core single-mode optical fibers used at a wavelength of 1.55 μm exhibit such a large optical connection losses as large as 1 dB.

The conventional method and the difficulty in splicing fine optical fibers are described in "Development of Arc Fusion Splicer for Ribbon Fiber MF-3S by Tsutomu Onodera et al., Fujikura Technical Review 1990, pages 37 to 42. U.S. Pat. No. 4,978,201, to Yamada and Taya, incorporated herein by reference, discloses a method for measuring splice loss of an optical fiber.

It has been proposed that such a large optical connection loss takes place, on one hand, due to the difference of the outer diameters between two optical fibers to be fusion spliced, including the difference occurring from dust attached to the peripheral surface of the optical fibers and, on the other hand, due to the misalignment of the V-grooves formed in both blocks. However, currently manufactured optical fibers have accurate outer diameters and dust on their peripheral surfaces is carefully removed when they are fusion spliced. Further, the V-grooves in both blocks can be accurately formed so as to be accurately aligned with each other. Accordingly, it has been found that large optical connection loss does not occur from either such previously proposed causes. It is only in conjunction with the present invention that the cause of—and a reliable method of avoiding—such a large optical connection loss has now been discovered.

SUMMARY OF THE INVENTION

It is accordingly the object of this invention to provide an optical fiber cable of multi-core single-mode type comprising a plurality of optical fibers having a small core diameter and having a small optical connection loss.

In order to attain the object, an optical fiber cable of multi-core single-mode type comprises a series of groups of a plurality of optical fibers having end portions fusion spliced to corresponding end portions of the adjacent groups of optical fibers at an optical connection loss of at most 0.5 dB, each of said end portions having a radius of curvature in meters defined by:

at least $\lambda/1.41$ where $\lambda$ is a wavelength, in $\mu m$, at which the optical fiber cable is used.

It is a further object of the present invention to provide a method for producing such optical fiber cable having small optical connection loss.

For an optical fiber cable of multi-core single-mode type used at a wavelength of 1.3 $\mu m$, the radius of curvature of the end portion of each optical fiber is at least about 0.9 meter or more in order to attain an optical connection loss of at most 0.5 dB.

Further, for an optical fiber cable of multi-core single-mode type used at a wavelength of 1.55 $\mu m$ has a radius of curvature of about 1.1 meters or more to achieve an optical connection loss of at most 0.5 dB.

Still further, the core diameter of each optical fiber may be 8 to 10 $\mu m$.

The fusion splicing of optical fibers according to this invention allows for economically manufacturing optical fiber cables having an optical connection loss of 0.5 dB or less by fusion splicing a plurality of thin optical fibers of multi-core single-mode type in a batch manner. In addition, optical fibers can be easily reconnected in case of trouble.

BRIEF DESCRIPTION OF THE DRAWINGS

This invention will be described in detail by way of a preferred embodiment with reference to accompanying drawings in which.

DETAILED DESCRIPTION OF THE PREFERRED EMBODIMENT

The inventor of the present invention has found that the misalignment of the facing ends of the cores of the optical fibers each having a core diameter of 8 to 10 $\mu m$ mainly occurs from random bending of the end portion of optical fibers which bending is adversely an inherently generated when the optical fibers are manufactured and the invention further confirmed that this random bending can be the chief cause of an optical connection loss over 1 dB.

Figure 1:
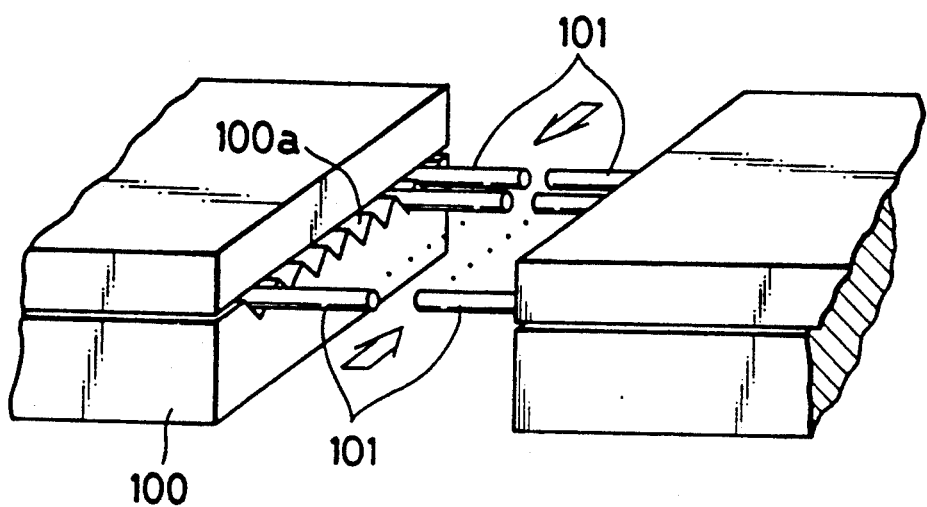
FIG. 1 is a perspective view of a fusion splicer for optical fibers arranged in optical fiber ribbons.
Figure 7:
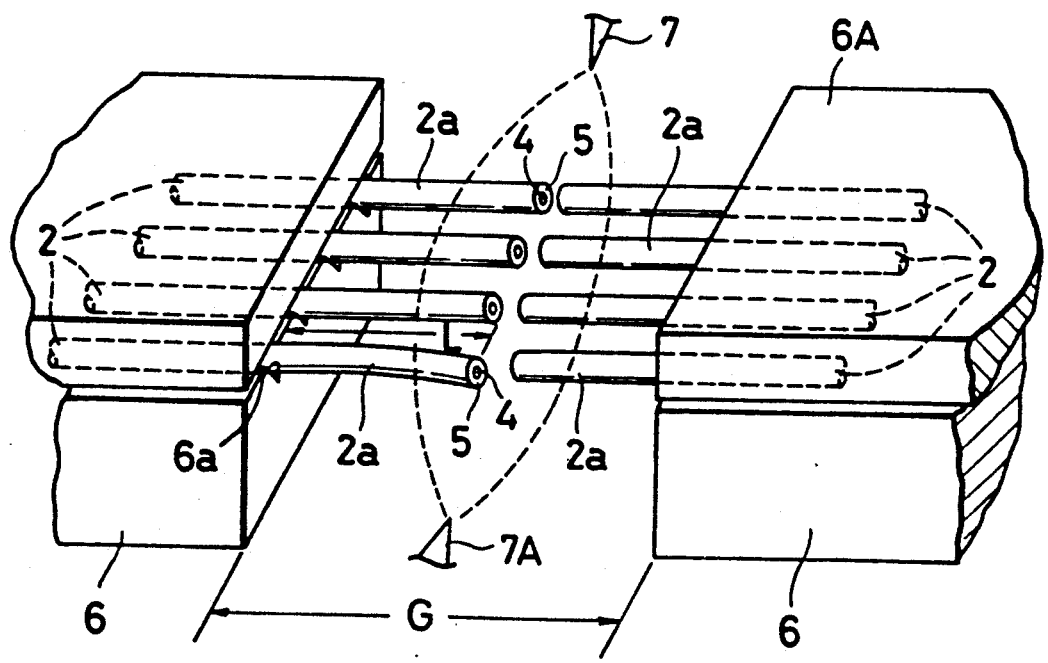
FIG. 7 is a perspective view showing how to effect the fusion splicing of the end portions of optical fibers according to the present invention.
Figure 2:
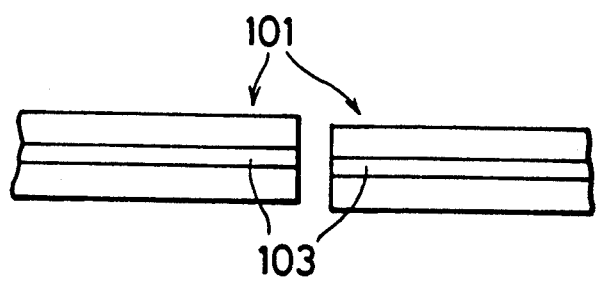
FIG. 2 is a side view of the abutted end portions of two optical fibers held on a pair of V-groove blocks.
Figure 3:
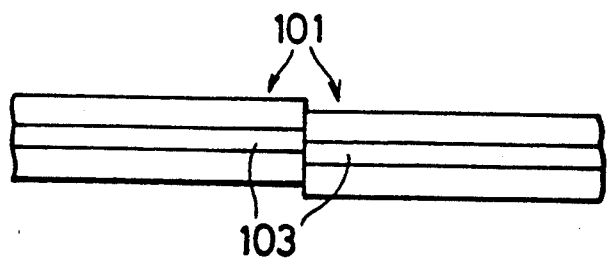
FIG. 3 is a side view of optical fibers whose end portions are being fusion spliced and are attracted toward each other by the surface tension.
Figure 4:
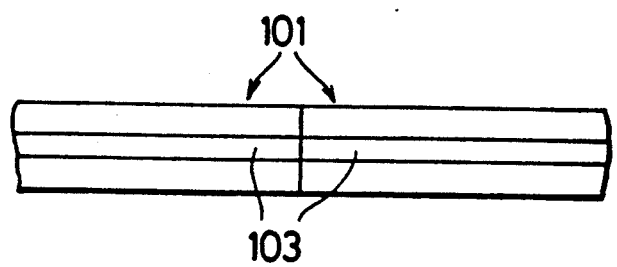
FIG. 4 is a side view of end portions of the optical fibers which are fusion spliced in an ideal way.
Figure 5:
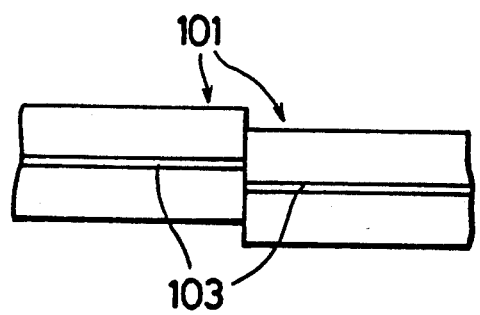
FIG. 5 is a side view of end portions of two conventional optical fibers which are held on opposed V-groove blocks and which are bent so as to be much deviated transversely from each other.
Figure 6:
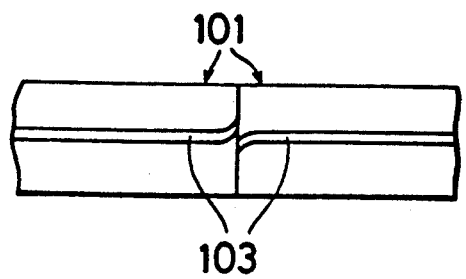
FIG. 6 is side view showing the misalignment of the free ends of the cores of the fusion spliced optical fibers of the prior art when the optical fibers are held on the V-groove blocks in a misaligned state as shown in FIG. 5.

As shown in FIG. 7, a pair of groups of optical fibers of multi-core single-mode type having a diameter of 8 to 10 $\mu m$ arrranged in two optical fiber ribbons (each ribbon containing four optical fibers 2, i.e., a four-core ribbon in this embodiment) are held in parallel V-grooves 6a formed in blocks 6 such that exposed end portions 2a of the optical fibers 2 extend from the bases 6A by a length L. When the curvature of the end portion 2a of an optical fiber 2 is constant, the amount of deviation $\delta$ is proportional to the extended length L of the exposed end portion 2a of the optical fiber 2. The shorter the extended length L, the smaller the amount of deviation $\delta$. In this respect, it is preferred that the extended length L of the end portion 2a of each optical fiber 2 be made as short as possible. However, the distance G between the V-groove blocks 6 typically must be at least 5 to 6 mm in order to heat the end portions 2a of the optical fibers 2 stably and fully by arc discharge produced between electrodes 7 and 7A.

Figure 8:
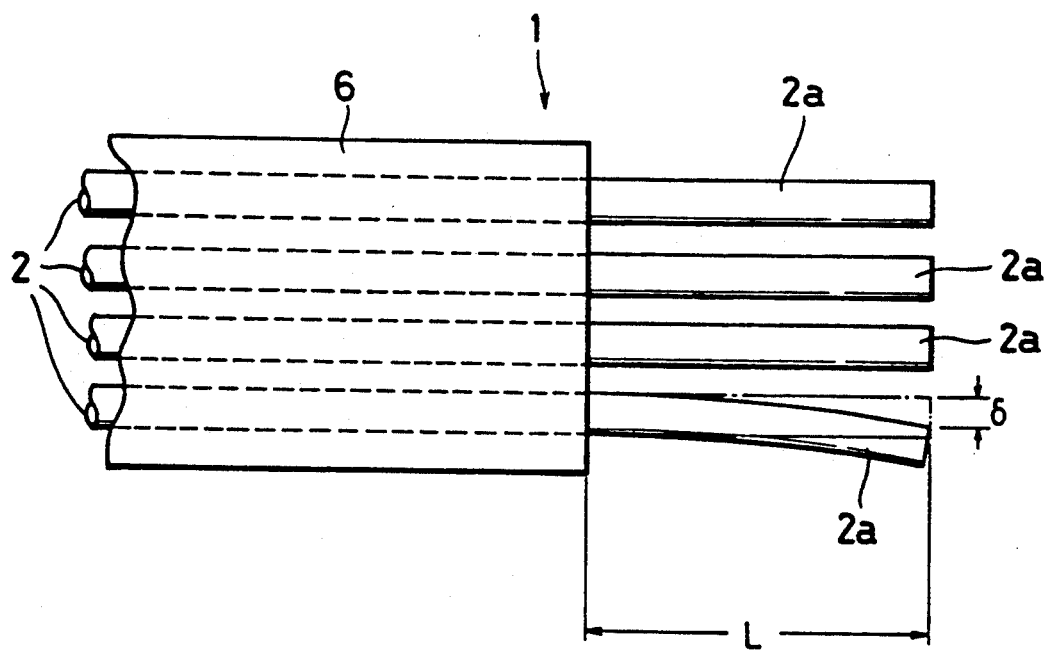
FIG. 8 is a plan view of end portions of optical fibers arranged in an optical fiber ribbon according to the present invention, in which the curvature of the end portion of one optical fiber is also exaggeratedly shown.
Figure 9:
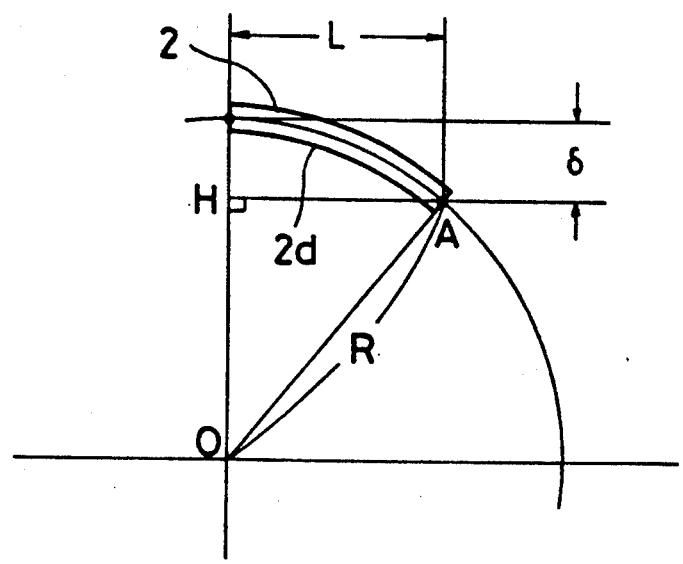
FIG. 9 is a plan view of an end portion of one optical fiber in FIG. 7, in which the curvature of the end portion is exaggeratedly shown in order to explain the principle of the present invention.

A principle of the present invention will now be explained with reference to FIGS. 8 and 9.

Suppose that R is the radius of curvature of the extended end portion 2a of an optical fiber 2. Then, $$R^2 = L^2 + (R-\delta)^2$$

where R, L and $\delta$ are expressed in meters and L is approximately equal to G/2.

Therefore, $$R = (L^2 + \delta^2)/2\delta \qquad (1)$$

The inventor of the instant invention has made experiments to find the relationships between the curvatures (which are reciprocals of the radii of curvature and the unit of which is expressed in 1/meter) and the optical connection losses of fusion spliced multi-core single-mode optical fibers used at a wavelength of 1.3 $\mu m$ and at a wavelength of 1.55 $\mu m$.

First series A and AA of the experiments for both wavelengths were made by bending the opposed end portions 2a of the paired optical fibers 2 at the same curvature in the opposite directions such that the largest difference existed between the extreme ends of the paired optical fibers 2.

Second series B and BB of the experiments for both wavelengths were carried out by bending the end portion 2a of one of the paired optical fibers 2 and by rendering straight the opposed end portion 2a of the other optical fiber 2 such that the cores 4 in the clads 5 of the paired optical fibers 2 (FIG. 7) were deviated transversely by half a distance of the distance between the cores of the first series A and AA.

Figure 10:
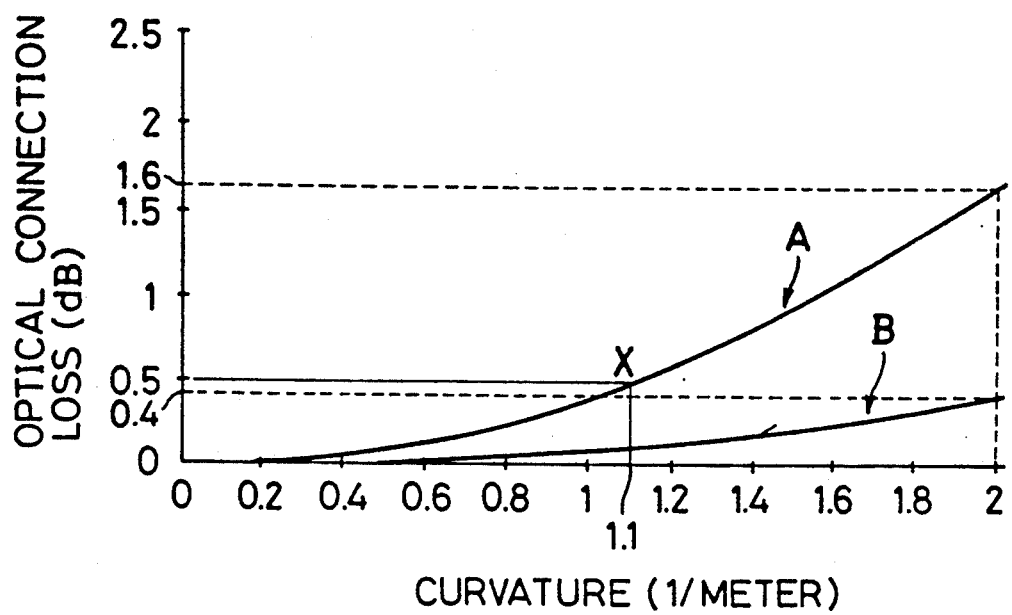
FIG. 10 is a graph showing relationships between the curvatures and the optical connection losses of optical fibers used at a wavelength of 1.3 $\mu m$ according to the present invention.
Figure 11:
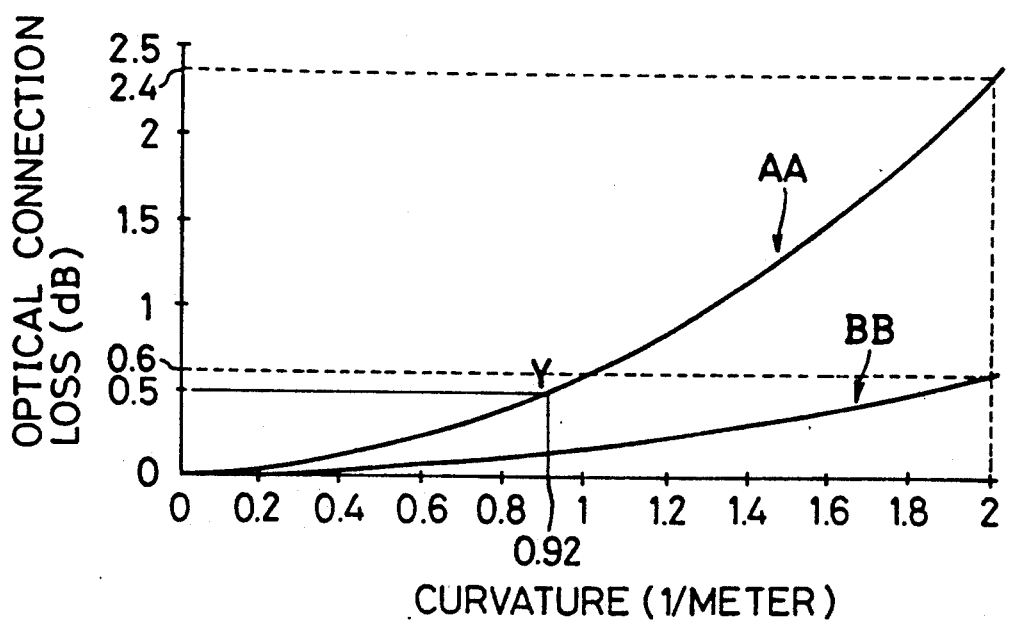
FIG. 11 is a graph showing relationships between the curvatures and the optical connection losses of optical fibers used at a wavelength of 1.55 $\mu m$ according to the present invention.

The results of the experiments are shown in FIG. 10 for the wavelength of 1.3 μm and in FIG. 11 for the wavelength of 1.55 μm.

When the curvature is 2/meter or the radius of curvature R is 0.5 meter, the optical connection losses at the 1.3 μm wavelength are substantially 1.6 dB for the optical fibers of the first series A and substantially 0.4 dB for the optical fibers of the second series B, and the optical connection losses at the 1.55 μm wavelength are substantially 2.4 dB for the optical fibers of the first series AA and substantially 0.6 dB for the optical fibers of the second series BB. It is understood that the optical connection loss of the optical fibers at the 1.55 μm wavelength is larger than that at the 1.3 μm wavelength, since the core diameter of the optical fibers at the 1.55 μm wavelength is smaller than that at the 1.3 μm wavelength.

The experiments lead to the following relationships between the amounts of traversal core displacements δ and the optical connection losses:

$$\alpha = \alpha_0 \cdot \delta \qquad (2)$$

where α is the optical connection loss and $\alpha_0$ is a constant uniquely determined from the mode field diameter of an optical fiber; and $$\alpha_0 \approx 5 \times 10^{-3} \text{ db}/\mu m^2$$

for an optical fiber at the 1.3μ wavelength; and $$\alpha_0 \approx 7.2 \times 10^{-3} \text{ dB}/\mu m^2$$

at an optical fiber for the 1.55μ wavelength.

Since the transmission loss of optical fibers of 0.2 to 0.3 dB/Km or less can be obtained in optical fiber network systems and the average optical connection loss of substantially 0.05 dB is attained for single-core optical fibers, it is preferred in optical fibers at wavelengths of 1.3 and 1.55 μm that the average optical connection loss be substantially 0.1 dB and the maximum connection loss allowance be substantially 0.5 dB in order to obtain economical and practical communication network systems.

As shown in FIGS. 10 and 11, the points X and Y which are the intersections of the ordinates indicating the optical connection loss of 0.5 dB and the curves of the series A and AA of the experiments fall on the values of 1.1 and 0.92/meter on the abscissas indicating curvatures, respectively. In other words, the radii of curvature at the wavelength of 1.3 μm and the wavelength of 1.55 μm are 0.92 meter (approximately 0.9 meter) and 1.1 meters, respectively.

Since 1.3/0.92 = 1.41 and 1.55/1.1 = 1.41, it should be rationalized that the radius of curvature R of optical fibers which have the optical connection loss of 0.5 dB is expressed by:

$$R = \lambda/1.41 \text{ in meters} \qquad (3)$$

where λ is a wavelength in μm at which the optical fibers are used.

Optical fibers which satisfy the condition expressed by Equation (3) are obtained by manufacturing them accurately under controlled manufacturing conditions or by selecting suitable optical fibers.

Embodiments of optical fiber cables according to this invention are constituted by fusion splicing the above-mentioned embodiments of the optical fibers in batch. To ensure optical connection losses less than 0.5 dB the instant invention includes the method of determining the radii of curvature of optical fibers to be fused and then selecting for fusion splicing only those which, according to the relationships described herein, yield acceptable connection losses. Finally, the selected optical fibers are fusion spliced to obtain the desired quality product. Of course, the relationships and methods of the present invention can also be used to produce series of optical fibers with designed maximum connection losses predetermined to be different (either higher or lower) than the 0.5 dB connection loss described in conjunction with the preferred embodiment herein.

In place of optical fibers of ribbon type, there may be used any batched form of optical fibers such as a plurality of optical fibers so arranged in a loose tube or the like that their opposed ends can be spliced together in batch.

While the applicant has described the present invention in a preferred embodiment, the applicant does not limit the present invention to the disclosed embodiment, but, on the contrary, intends the invention to cover various modifications and equivalents included within the spirit and scope of the appended claims.

What is claimed:

1. A method of producing an optical fiber cable of multi-core single-mode type for carrying signals at 80 μm wavelength, said method comprising:

providing a first and a second plurality of optical fibers, each optical fiber of said pluralities of optical fibers having an end portion for fusion splicing and each of said end portions having a radius of curvature in meters defined by:

at least λ/1.41 where λ is a wavelength, in μm, fusion splicing the end portion of each of said first plurality of optical fibers with a corresponding end portion of one of said second plurality of optical fibers so that the optical connection loss at the fusion spliced connection is at most 0.5 dB.

2. The method of claim 1, wherein said optical fiber cable is used at a wavelength of about 1.3 μm and said radius of curvature is at least 0.9 meters.

3. The method of claim 2, wherein each of said optical fibers has a core diameter of 8 to 10 μm.

4. A product made by the process of claim 3.

5. The method of claim 1, wherein said optical fiber cable is used at a wavelength of about 1.55 μm and said radius of curvature is at least 1.1 meters.

6. The method of claim 5, wherein each of said optical fibers has a core diameter of 8 to 10 μm.

7. A product made by the process of claim 6.

8. A product made by the process of claim 1.

9. A method of providing an optical fiber cable of multi-core single-mode type, for use at a wavelength of λ μm, comprising a series of groups of a plurality of optical fibers having end portions fusion spliced to corresponding end portions of adjacent groups of optical fibers with a maximum optical connection loss at such fusion splicings of at most 0.5 dB, said method comprising:

ensuring that each optical fiber of each group of optical fibers has a radius of curvature in meters of at least about λ/1.41, where λ is a wavelength, in μm, at which the optical fiber cable is to be used, fusion splicing end portions of one group of a plurality of optical fibers with corresponding end portions of a second group of a plurality of optical fibers to produce a series of groups of optical fibers.

10. The method of claim 9, wherein said optical fiber cable is used at a wavelength of about 1.3 μm and said radius of curvature is at least 0.9 meters and wherein each of said optical fibers has a core diameter of 8 to 10 μm.

11. A product made by the process of claim 10.

12. The method of claim 9, wherein said optical fiber cable is used at a wavelength of about 1.55 μm and said radius of curvature is at least 1.1 meters and wherein each of said optical fibers has a core diameter of 8 to 10 μm.

13. A product made by the process of claim 12.

14. A product made by the process of claim 9.

15. A method of providing an optical fiber cable of multi-core single-mode type, for use at a wavelength of $\lambda$ μm, comprising a series of groups of a plurality of optical fibers having end portions fusion spliced to corresponding end portions of adjacent groups of optical fibers with a maximum optical connection loss at such fusion splicings of at most 0.5 dB, said method comprising:

reviewing the radius of curvature of each optical fiber of a series of groups of optical fibers to determine whether each such optical fiber has a radius of curvature in meters of at least about $\lambda/1.41$, where $\lambda$ is a wavelength, in μm, at which the optical fiber cable is to be used, rejecting any groups of optical fibers for which the radius of curvature in meters is not at least about $\lambda 1.41$, accepting groups of optical fibers for which the radius of curvature in meters is at least about $\lambda/1.41$, fusion splicing end portions of one of said accepted groups of a plurality of optical fibers with corresponding end portions of a plurality of optical fibers of a second accepted group of optical fibers to produce a series of groups of optical fibers with a maximum optical connection loss at such fusion splicings of at most 0.5 dB.

16. An optical fiber cable of multi-core single-mode type comprising a series of groups of a plurality of optical fibers having end portions fusion spliced to corresponding end portions of adjacent groups of optical fibers at an optical connection loss of at most 0.5 dB, each of said end portions having a radius of curvature in meters defined by:

$$\text{at least } \lambda/1.41$$

where $\lambda$ is a wavelength, in μm, at which said optical fiber cable is used.

17. The optical fiber cable according to claim 16, wherein said optical fiber cable is used at a wavelength of 1.3 μm and said radius of curvature is at least 0.9 meters.

18. The optical fiber cable according to claim 17, wherein each of said optical fibers has a core diameter of 8 to 10 μm.

19. The optical fiber cable according to claim 16, wherein said optical fiber cable is used at wave-length of 1.55 μm and said radius of curvature is at least 1.1 meters.

20. The optical fiber cable according to claim 19, wherein each of said optical fibers has a core diameter of 8 to 10 μm.

* * * * *